US010465400B1

(12) United States Patent
Stephens et al.

(10) Patent No.: US 10,465,400 B1
(45) Date of Patent: Nov. 5, 2019

(54) DRYWALL SHEET LIFTING DEVICE (71) Applicants: Lorenzo Stephens, Loganville, GA (US); Emma Stephens, Loganville, GA (US)

(72) Inventors: Lorenzo Stephens, Loganville, GA (US); Emma Stephens, Loganville, GA (US)

(*) Notice: Subject to any disclaimer, the term of this patent is extended or adjusted under 35 U.S.C. 154(b) by 0 days.

(21) Appl. No.: 16/181,477

(22) Filed: Nov. 6, 2018

(51) Int. Cl.
E04G 21/16 (2006.01)
F16M 11/42 (2006.01)
F16M 11/04 (2006.01)
E04F 21/18 (2006.01)
E04B 2/72 (2006.01)

(52) U.S. Cl.
CPC .......... E04G 21/16 (2013.01); E04F 21/1816 (2013.01); E04F 21/1822 (2013.01); E04G 21/168 (2013.01); F16M 11/046 (2013.01); F16M 11/42 (2013.01); E04B 2/723 (2013.01)

(58) Field of Classification Search
CPC ..... E04G 21/16; E04G 21/168; F16M 11/046; F16M 11/42; E04B 2/723; E04F 21/18; E04F 21/1805
USPC ................................................ 414/10–12, 23
See application file for complete search history.

(56) References Cited

U.S. PATENT DOCUMENTS 2,815,251 A * 12/1957 Stone .................. E04F 21/1822 254/387
2,828,870 A * 4/1958 Corley ...................... B66C 7/00 414/11
3,028,978 A 4/1962 Dickens
3,305,219 A * 2/1967 Rhodes ...................... B66B 9/16 254/4 R
3,317,059 A * 5/1967 Higgins .............. E04F 21/1822 254/3 R
3,871,477 A 3/1975 Kuest
4,064,999 A * 12/1977 Young ................. E04F 21/1811 414/11
4,339,219 A * 7/1982 Lay ..................... E04F 21/1822 254/4 C
4,449,879 A * 5/1984 Mercer ............... E04F 21/1822 211/2
5,397,207 A * 3/1995 Arellano ............. E04F 21/1805 254/98
5,441,379 A * 8/1995 Gilbert, Jr. ................ E04C 2/38 414/11

(Continued)

FOREIGN PATENT DOCUMENTS

CA 2123560 11/1995

Primary Examiner — Lynn E Schwenning (57) ABSTRACT

The drywall sheet lifting device comprises a lower frame and an upper frame. The lower frame may comprise a set of wheels to allow the drywall sheet lifting device to be moved into position. The lower frame may comprise telescopic joints in the side supports and hinged joints in the front and rear support to permit reduction of size of the lower frame for storage and transportation purposes. The upper frame may be coupled to the lower frame via two uprights. The upper frame may comprise a plurality of center braces to support a sheet of drywall. The upper frame may comprise a plurality of stop plates to prevent the sheet of drywall from sliding off. The upper frame may pivot between a first position for loading and a second position for installing. The upper frame may be raised or lower via telescopic joints in the uprights.

11 Claims, 5 Drawing Sheets (56) References Cited

U.S. PATENT DOCUMENTS

| | | | |
|---|---|---|---|
| 7,264,226 B2 | 9/2007 | Smith | |
| 7,266,933 B2 * | 9/2007 | Pasek | E04B 9/006 248/454 |
| 7,581,915 B1 * | 9/2009 | Bristol | E04F 21/1816 414/11 |
| 7,780,389 B1 * | 8/2010 | Young | B62B 3/022 280/43.22 |
| 2008/0008561 A1 * | 1/2008 | Hontz, Jr. | E04F 21/1822 414/11 |
| 2014/0294540 A1 * | 10/2014 | Shaw | B66C 23/48 414/11 |

* cited by examiner

DRYWALL SHEET LIFTING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of construction equipment, more specifically, a drywall sheet lifting device.

SUMMARY OF INVENTION

The drywall sheet lifting device comprises a lower frame and an upper frame. The lower frame may comprise a set of wheels to allow the drywall sheet lifting device to be moved into position. The lower frame may comprise telescopic joints in the side supports and hinged joints in the front and rear support to permit reduction of size of the lower frame for storage and transportation purposes. The upper frame may be coupled to the lower frame via two uprights. The upper frame may comprise a plurality of center braces to support a sheet of drywall. The upper frame may comprise a plurality of stop plates to prevent the sheet of drywall from sliding off. The upper frame may pivot between a first position for loading and a second position for installing. The upper frame may be raised or lower via telescopic joints in the uprights.

An object of the invention is to lift a sheet or drywall into position for installation.

Another object of the invention is to provide a pivoting upper frame with a first position for loading and a second position for installing a sheet of drywall.

A further object of the invention is to provide an elevating upper frame with a first height for maneuvering and a second height for installing a sheet of drywall.

Yet another object of the invention is to provide telescopic and hinged joints on the supports for the lower frame to reduce the size of the frame for transportation and storage.

These together with additional objects, features and advantages of the drywall sheet lifting device will be readily apparent to those of ordinary skill in the art upon reading the following detailed description of the presently preferred, but nonetheless illustrative, embodiments when taken in conjunction with the accompanying drawings.

In this respect, before explaining the current embodiments of the drywall sheet lifting device in detail, it is to be understood that the drywall sheet lifting device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the drywall sheet lifting device.

It is therefore important that the claims be regarded as including such equivalent construction insofar as they do not depart from the spirit and scope of the drywall sheet lifting device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The drywall sheet lifting device 100 (hereinafter invention) comprises a lower frame and an upper frame. The invention 100 is a tool for installing drywall. A sheet of drywall 905 may be placed upon the upper frame while the upper frame is in a first position 400. The upper frame may be pivoted from the first position 400 to a second position 410 and raised from a first height 420 to a second height 430 where the second height 430 is above the first height 420. The lower frame may be maneuvered to place the sheet of drywall 905 in alignment with other panels of the drywall that have already been installed and then the sheet of drywall 905 may be attached to a support structure.

Figure 1:
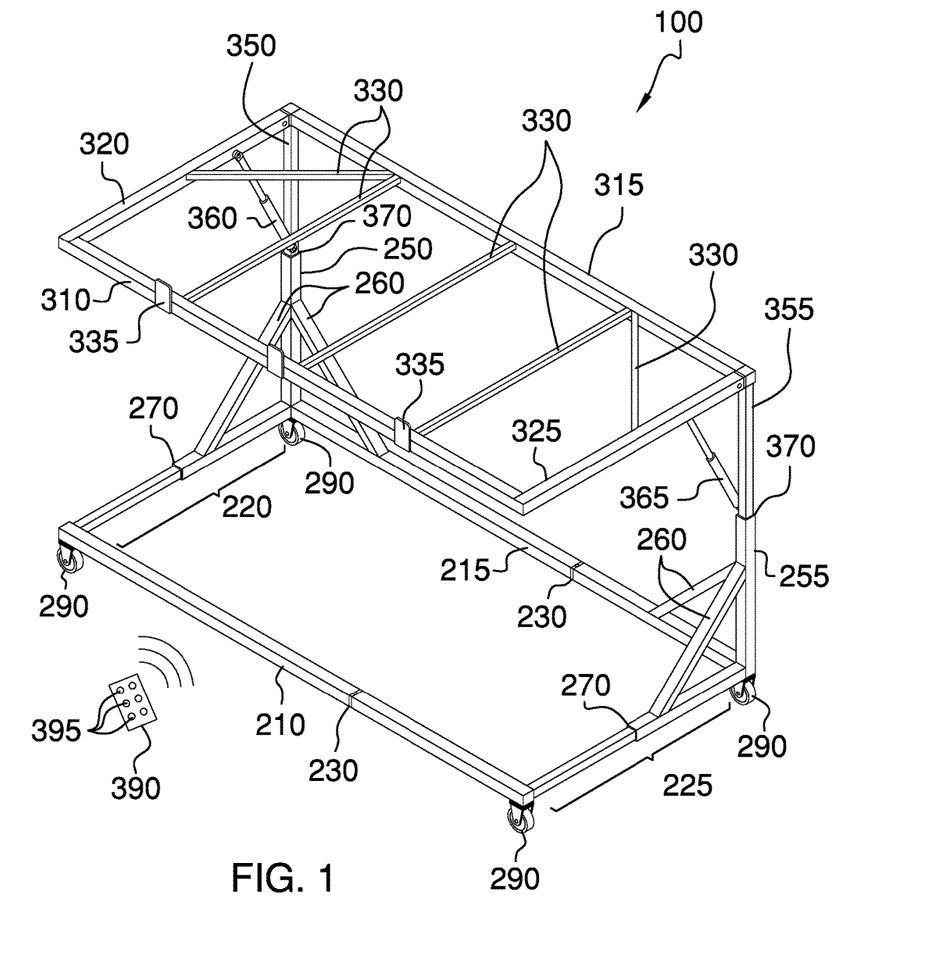
FIG. 1 is a perspective view of an embodiment of the disclosure.
Figure 2:
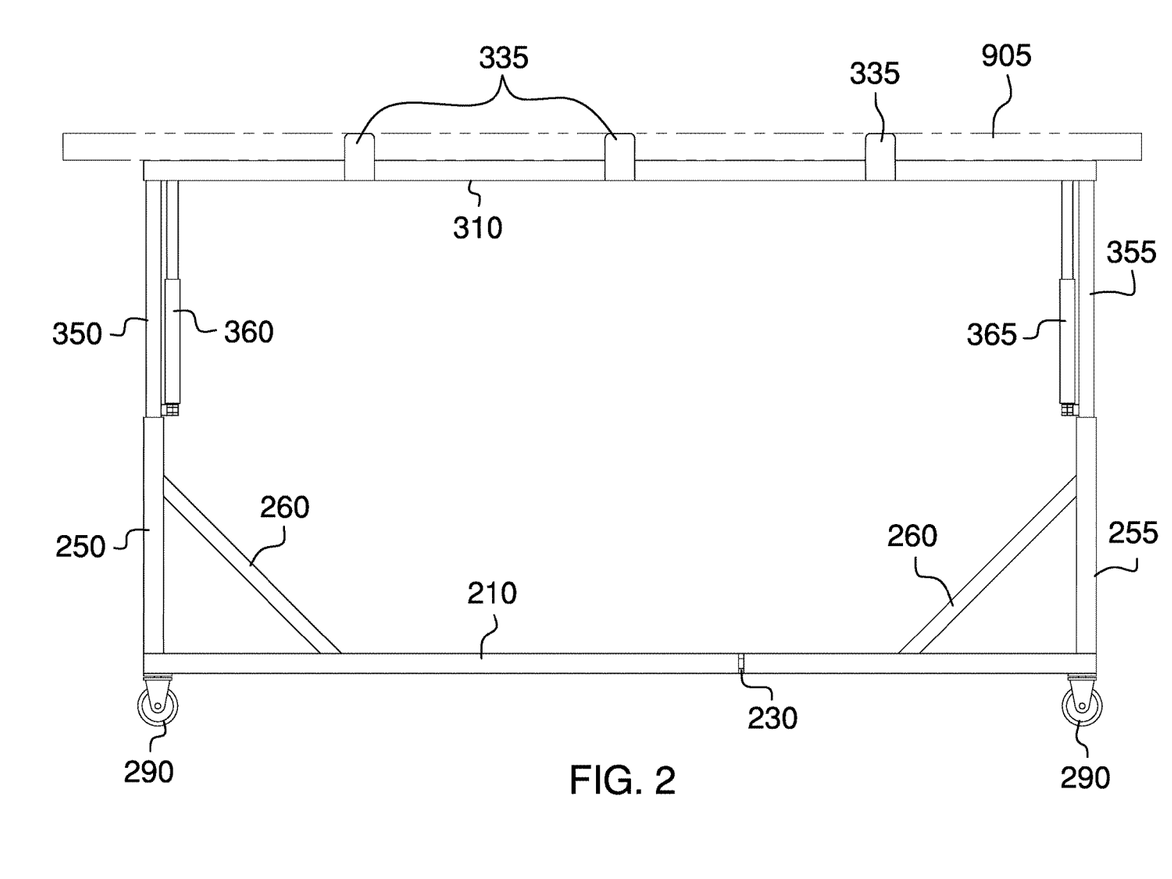
FIG. 2 is a front view of an embodiment of the disclosure.

The lower frame comprises a lower front support 210, a lower rear support 215, a lower left support 220, a lower right support 225, a lower left upright 250, a lower right upright 255, and a plurality of wheels 290. The lower frame may be rectangular in shape. The lower frame may be formed by coupling the lower front support 210 to the front end of the lower left support 220 and to the front end of the lower right support 225 and by coupling the lower rear support 215 to the rear end of the lower left support 220 and to the rear end of the lower right support 225

The lower left upright 250 may be a vertical armature coupled to the top of the lower frame above the intersection of the lower rear support 215 and the lower left support 220. The lower right upright 255 may be a vertical armature coupled to the top of the lower frame above the intersection of the lower rear support 215 and the lower right support 225. Both the lower left upright 250 and the lower right upright 255 may be braced by a plurality of lower corner braces 260. The plurality of lower corner braces 260 may be coupled at one end to the lower left upright 250 or to the lower right upright 255 and may be coupled at the opposite end to the lower rear support 215, the lower left support 220, or the lower right support 225. In some embodiments, the plurality of lower corner braces 260 may be detachable from sockets on the lower frame by pulling upwards on the plurality of lower corner braces 260.

The plurality of wheels 290 may be mounted to the underside of the lower frame at each corner of the lower frame. The plurality of wheels 290 may be free to swivel 360 degrees, may be fixed in a specific angular orientation, or a combination thereof. As a non-limiting example, two wheels on a side may be free to swivel while the remaining two wheels may be fixed. The plurality of wheels 290 may have brake latches to prevent movement on some or all of the plurality of wheels 290.

Figure 5:
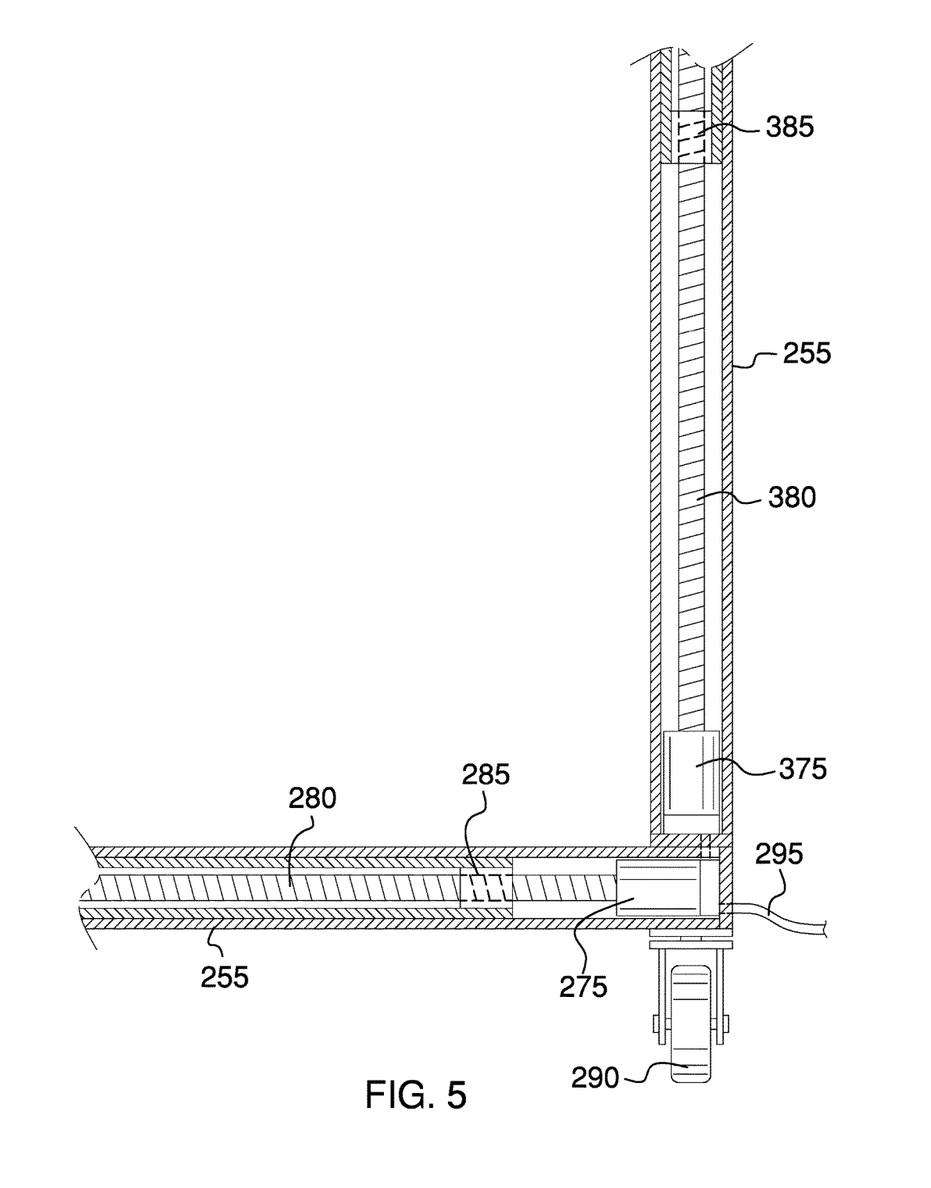
FIG. 5 is a detail view of an embodiment of the disclosure illustrating a telescopic frame joint and a telescopic upright joint.

The lower left support 220 and the lower right support 225 may each comprise a telescopic frame joint 270. The telescopic frame joints 270 may allow the lower frame to reduce its size from front to rear. Each the telescopic frame joint 270 may comprise a frame joint motor 275, a frame joint rod 280, and a frame joint screw gear 285. The frame joint motor 275 may be coupled to one half of the telescopic frame joint 270. The frame joint screw gear 285 may be coupled to the other half of the telescopic frame joint 270. The frame joint rod 280 may be coupled to the frame joint motor 275 and may pass through the frame joint screw gear 285. The size, shape, and pitch of the thread on the frame joint rod 280 may complement the size, shape, and pitch of the thread on the frame joint screw gear 285 such that rotation of the frame joint rod 280 may cause the frame joint screw gear 285 to move linearly along the frame joint rod 280. The frame joint motor 275 may convert electrical energy into mechanical energy. The frame joint motor 275 may cause rotation of the frame joint rod 280 when electrical energy is applied to the frame joint motor 275. The electrical energy applied to the frame joint motor 275 may be controlled by an remote control 390. The frame joint motor 275 may receive power from a power cord 295.

In some embodiments, the lower front support 210 and the lower rear support 215 may each comprise a hinged joint 230. The telescopic frame joints 270 may allow the lower frame to be folded into a smaller footprint when the upper frame is removed.

The upper frame comprises an upper front support 310, an upper rear support 315, an upper left support 320, an upper right support 325, an upper left upright 350, an upper right upright 355, a plurality of center braces 330, a left lift cylinder 360, a right lift cylinder 365, and a plurality of stop plates 335. The upper frame may be rectangular in shape.

The upper frame may be formed by coupling the upper front support 310 to the front end of the upper left support 320 and to the front end of the upper right support 325 and by coupling the upper rear support 315 to the rear end of the upper left support 320 and to the rear end of the upper right support 325

The upper left upright 350 may be a vertical armature hingedly coupled to the bottom of the upper frame below the intersection of the upper rear support 315 and the upper left support 320. The upper left upright 350 may slidably couple to the lower left upright 250. The upper right upright 355 may be a vertical armature hingedly coupled to the bottom of the upper frame below the intersection of the upper rear support 315 and the upper right support 325. The upper right upright 355 may slidably couple to the lower right upright 255.

Figure 3:
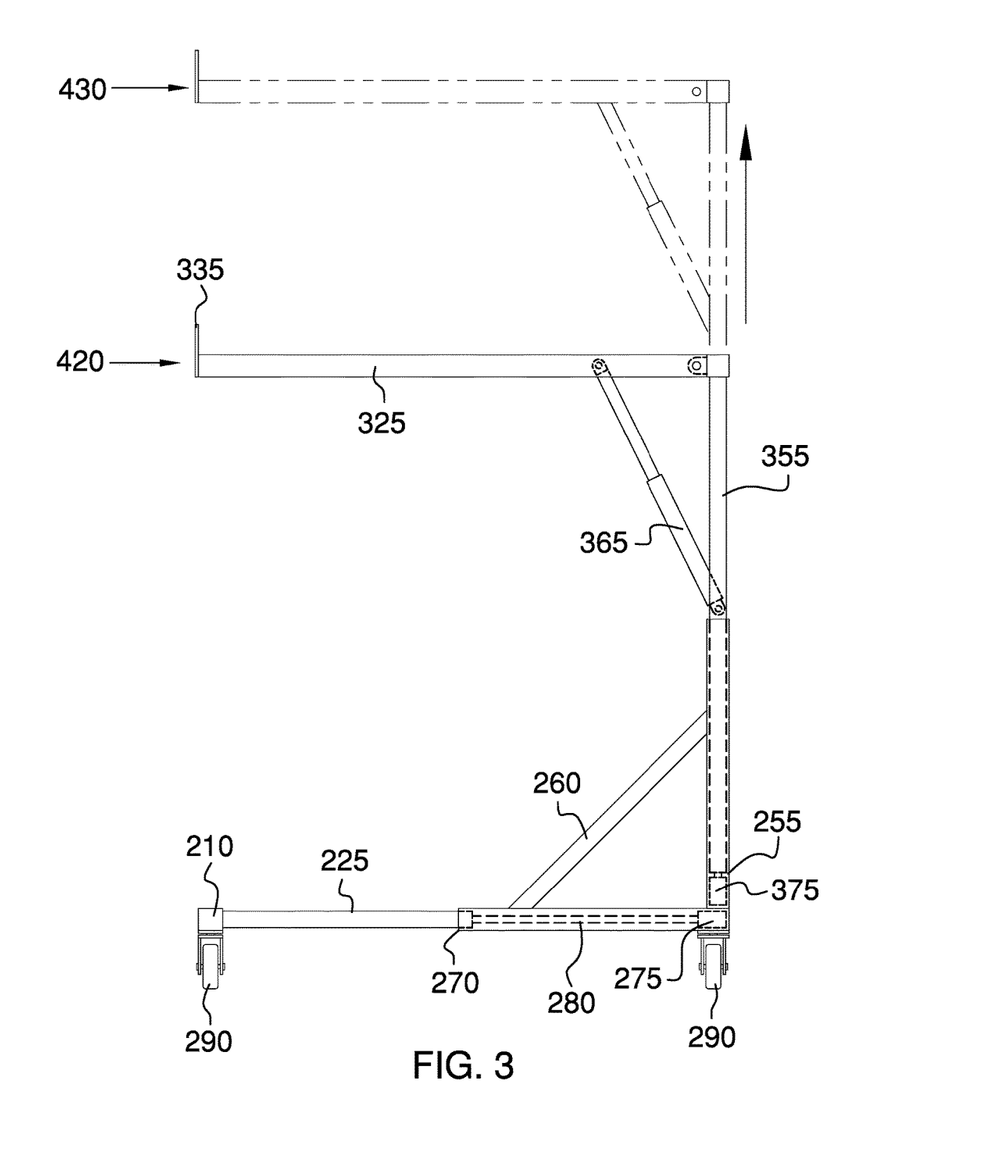
FIG. 3 is a side view of an embodiment of the disclosure illustrating the first and second heights of the upper frame.

The joint between the upper left upright 350 and the lower left upright 250 and the joint between the upper right upright 355 and the lower right upright 255 may each comprise a telescopic upright joint 370. The telescopic upright joints 370 may allow the elevation of the upper frame to be increased from the first height 420 to the second height 430, or vice versa. Each the telescopic upright joint 370 may comprise an upright joint motor 375, an upright joint rod 380, and an upright joint screw gear 385. The upright joint motor 375 may be coupled to one half of the telescopic upright joint 370. The upright joint screw gear 385 may be coupled to the other half of the telescopic upright joint 370. The upright joint rod 380 may be coupled to the upright joint motor 375 and may pass through the upright joint screw gear 385. The size, shape, and pitch of the thread on the upright joint rod 380 may complement the size, shape, and pitch of the thread on the upright joint screw gear 385 such that rotation of the upright joint rod 380 may cause the upright joint screw gear 385 to move linearly along the upright joint rod 380. The upright joint motor 375 may convert electrical energy into mechanical energy. The upright joint motor 375 may cause rotation of the upright joint rod 380 when electrical energy is applied to the upright joint motor 375. The electrical energy applied to the upright joint motor 375 may be controlled by the remote control 390. The upright joint motor 375 may receive power from the power cord 295.

The plurality of center braces 330 may be armatures that provide stiffening support for the upper frame. The plurality of center braces 330 may run from front to rear, from side to side, diagonally across corners, or combinations thereof.

Figure 4:
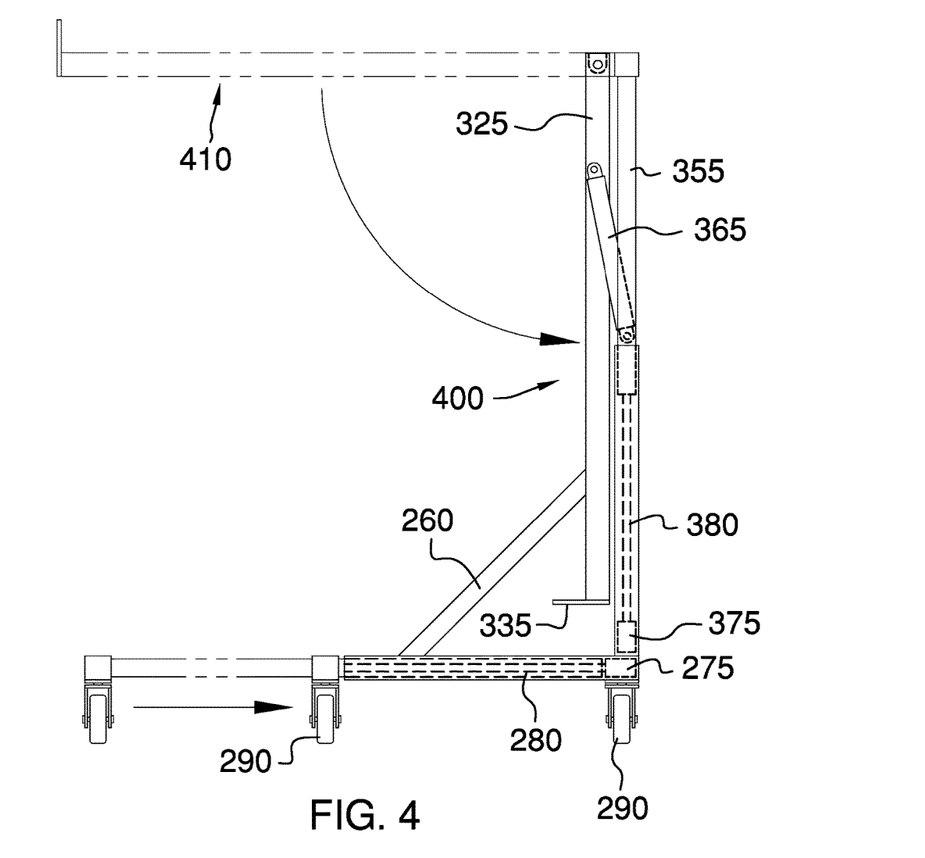
FIG. 4 is a side view of an embodiment of the disclosure illustrating the first and second positions of the pivoting upper frame.

The left lift cylinder 360 may be hingedly coupled to the upper left support 320 at one end and may be hingedly coupled to the upper left upright 350 at the opposite end. The right lift cylinder 365 may be hingedly coupled to the upper right support 325 at one end and may be hingedly coupled to the upper right upright 355 at the opposite end. The left lift cylinder 360 and the right lift cylinder 365 may each be a linear actuator. The left lift cylinder 360 and the right lift cylinder 365 may extend to pivot the upper frame from the first position 400 to the second position 410, or vice versa.

The plurality of stop plates 335 may be coupled to the front side of the upper front support 310 and may extend above the upper front support 310. The plurality of stop plates 335 may prevent the sheet of drywall 905 from sliding off of the upper frame.

The remote control 390 may be adapted to allow an operator to control the operation of the invention 100 from a distance. The remote control 390 may comprise a plurality of operator controls 395 that may expand or retract the size of the lower frame, may cause the upper frame to ascend or descend, may cause the upper frame to pivot to the first position 400 or to the second position 410, or combinations thereof.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, a "brake" is a device that is used to slow or stop the motion of a machine or a vehicle.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, "elevation" refers to the span of the distance between a horizontal surface and a support surface as measured in the direction opposite to the force of gravity.

As used in this disclosure, a "footprint" is the surface area occupied by an object.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "gear" is a toothed wheel, cylinder, or other toothed mechanical element that is used to transmit motion, a change of speed, or a change of direction to second toothed wheel, cylinder, or other toothed mechanical element.

As used herein, a "linear actuator" is a device that produces linear motion. The device may be electromechanical, hydraulic, or pneumatic in nature. Upon activation by an electrical potential or by a change in fluid or air pressure, the overall length of the device may change—either by lengthening or shortening. In use, a first component of the linear actuator, which may be referred to as a motor or body, is fixed mounted to a first object and a second component of the linear actuator, which may be referred to as an actuator arm or lead screw, is fixed mounted to a second object. Activation of the device may cause the second component to linearly move relative to the first component thus changing the distance between the first object and the second object.

As used in this disclosure, a "motor" refers to a device that transforms energy from an external power source into mechanical energy.

As used in this disclosure, "orientation" refers to the positioning and/or angular alignment of a first object relative to a second object or relative to a reference position or reference direction.

As used in this disclosure, the term "pitch" refers to the rotation or oscillation of a vehicle around the lateral axis of a vehicle. When a vehicle is resting in a normal position on a level surface, the lateral axis is defined as the axis that: 1) is perpendicular to the roll axis; and, 2) is parallel to the level surface. In this definition, the level surface is strictly a reference in the sense that the definition of the lateral angle remains unchanged should the surface change. The lateral angle is also commonly referred to as the pitch axis. More colloquially, pitch would be referred to a moving the nose of the vehicle up or down.

As used herein, the word "pitch" refers to the center-to-center spacing between a plurality of objects or holes.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, "remote control" refers to the establishment of control of a device from a distance. Remote control is generally accomplished through the use of an electrical device that generates electrically based control signals that are transmitted via radio frequencies to the device. Some remote controls may use infrared light to communicate with a device.

As used in this disclosure, a "rod" is a straight structure in which two dimensions of the structure appear thin relative to a third dimension of the straight structure.

As used in this disclosure, "telescopic" is an adjective that describes an object made of sections that fit or slide into each other such that the object can be made longer or shorter by adjusting the relative positions of the sections.

As used in this disclosure, a "tool" is a device, an apparatus, or an instrument that is used to carry out an activity, operation, or procedure.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A drywall sheet lifting device comprising:
   a lower frame and an upper frame;
   wherein the drywall sheet lifting device is a tool for installing drywall;
   wherein a sheet of drywall is placed upon the upper frame while the upper frame is in a first position;
   wherein the upper frame is pivoted from the first position to a second position and raised from a first height to a second height where the second height is above the first height;

wherein the lower frame is maneuvered to place the sheet of drywall in alignment with other panels of the drywall that have already been installed and then the sheet of drywall is attached to a support structure;

wherein the lower frame comprises a lower front support, a lower rear support, a lower left support, a lower right support, a lower left upright, a lower right upright, and a plurality of wheels;

wherein the lower frame is rectangular in shape;

wherein the lower frame is formed by coupling the lower front support to the front end of the lower left support and to the front end of the lower right support and by coupling the lower rear support to the rear end of the lower left support and to the rear end of the lower right support;

wherein the lower left upright is a vertical armature coupled to the top of the lower frame above the intersection of the lower rear support and the lower left support;

wherein the lower right upright is a vertical armature coupled to the top of the lower frame above the intersection of the lower rear support and the lower right support;

wherein both the lower left upright and the lower right upright are braced by a plurality of lower corner braces;

wherein the plurality of lower corner braces is coupled at one end to the lower left upright or to the lower right upright and is coupled at the opposite end to the lower rear support, the lower left support, or the lower right support;

wherein the plurality of wheels is mounted to the underside of the lower frame at each corner of the lower frame;

wherein the plurality of wheels is free to swivel 360 degrees, is fixed in a specific angular orientation, or a combination thereof;

wherein the lower left support and the lower right support each comprise a telescopic frame joint;

wherein the telescopic frame joints allow the lower frame to reduce its size from front to rear;

wherein each the telescopic frame joint comprises a frame joint motor, a frame joint rod, and a frame joint screw gear;

wherein the frame joint motor is coupled to one half of the telescopic frame joint;

wherein the frame joint screw gear is coupled to the other half of the telescopic frame joint;

wherein the frame joint rod is coupled to the frame joint motor and passes through the frame joint screw gear;

wherein the size, shape, and pitch of the thread on the frame joint rod complement the size, shape, and pitch of the thread on the frame joint screw gear such that rotation of the frame joint rod causes the frame joint screw gear to move linearly along the frame joint rod;

wherein the frame joint motor converts electrical energy into mechanical energy;

wherein the frame joint motor causes rotation of the frame joint rod when electrical energy is applied to the frame joint motor;

wherein the electrical energy applied to the frame joint motor is controlled by an remote control.

2. The drywall sheet lifting device according to claim 1 wherein two wheels on a side are free to swivel while the remaining two wheels are fixed.

3. The drywall sheet lifting device according to claim 1 wherein the lower front support and the lower rear support each comprise a hinged joint;

wherein the telescopic frame joints allow the lower frame to be folded into a smaller footprint when the upper frame is removed.

4. The drywall sheet lifting device according to claim 3 wherein the upper frame comprises an upper front support, an upper rear support, an upper left support, an upper right support, an upper left upright, an upper right upright, a plurality of center braces, a left lift cylinder, a right lift cylinder, and a plurality of stop plates;

wherein the upper frame is rectangular in shape;

wherein the upper frame is formed by coupling the upper front support to the front end of the upper left support and to the front end of the upper right support and by coupling the upper rear support to the rear end of the upper left support and to the rear end of the upper right support.

5. The drywall sheet lifting device according to claim 4 wherein the upper left upright is a vertical armature hingedly coupled to the bottom of the upper frame below the intersection of the upper rear support and the upper left support;

wherein the upper left upright slidably couples to the lower left upright;

wherein the upper right upright is a vertical armature hingedly coupled to the bottom of the upper frame below the intersection of the upper rear support and the upper right support;

wherein the upper right upright slidably couples to the lower right upright.

6. The drywall sheet lifting device according to claim 5 wherein the joint between the upper left upright and the lower left upright and the joint between the upper right upright and the lower right upright each comprise a telescopic upright joint;

wherein the telescopic upright joints allow the elevation of the upper frame to be increased from the first height to the second height, or vice versa.

7. The drywall sheet lifting device according to claim 6 wherein each the telescopic upright joint comprises an upright joint motor, an upright joint rod, and an upright joint screw gear;

wherein the upright joint motor is coupled to one half of the telescopic upright joint;

wherein the upright joint screw gear is coupled to the other half of the telescopic upright joint;

wherein the upright joint rod is coupled to the upright joint motor and passes through the upright joint screw gear;

wherein the size, shape, and pitch of the thread on the upright joint rod complement the size, shape, and pitch of the thread on the upright joint screw gear such that rotation of the upright joint rod causes the upright joint screw gear to move linearly along the upright joint rod;

wherein the upright joint motor converts electrical energy into mechanical energy;

wherein the upright joint motor causes rotation of the upright joint rod when electrical energy is applied to the upright joint motor;

wherein the electrical energy applied to the upright joint motor is controlled by the remote control.

8. The drywall sheet lifting device according to claim 7 wherein the plurality of center braces are armatures that provide stiffening support for the upper frame;

wherein the plurality of center braces run from front to rear, from side to side, diagonally across corners, or combinations thereof.

9. The drywall sheet lifting device according to claim 8
wherein the left lift cylinder is hingedly coupled to the upper left support at one end and is hingedly coupled to the upper left upright at the opposite end;
wherein the right lift cylinder is hingedly coupled to the upper right support at one end and is hingedly coupled to the upper right upright at the opposite end;
wherein the left lift cylinder and the right lift cylinder each are a linear actuator;
wherein the left lift cylinder and the right lift cylinder extend to pivot the upper frame from the first position to the second position, or vice versa.

10. The drywall sheet lifting device according to claim 9
wherein the plurality of stop plates are coupled to the front side of the upper front support and extend above the upper front support;
wherein the plurality of stop plates prevent the sheet of drywall from sliding off of the upper frame.

11. The drywall sheet lifting device according to claim 10
wherein the remote control is adapted to allow an operator to control the operation of the drywall sheet lifting device from a distance;
wherein the remote control comprises a plurality of operator controls that expand or retract the size of the lower frame, cause the upper frame to ascend or descend, cause the upper frame to pivot to the first position or to the second position, or combinations thereof.

* * * * *